Patented Apr. 3, 1923.

1,450,467

UNITED STATES PATENT OFFICE.

HERMANN WEYLAND, OF ELBERFELD, GERMANY, ASSIGNOR TO FARBENFABRIKEN VORM. FRIEDR. BAYER AND CO. IN LEVERKUSEN, NEAR COLOGNE-ON-THE-RHINE, GERMANY.

SILICATE CEMENT.

No Drawing.   Application filed August 11, 1921. Serial No. 491,623.

(GRANTED UNDER THE PROVISIONS OF THE ACT OF MARCH 3, 1921, 41 STAT. L., 1313.)

*To all whom it may concern:*

Be it known that I, HERMANN WEYLAND, a citizen of Germany, residing at Elberfeld, Germany, have invented new and useful Improvements in Silicate Cements (for which I have filed applications in Germany, May 30, 1918; July 1, 1918; Oct. 2, 1919; England, June 4, 1920, Patent No. 165,659; Switzerland, June 3, 1920), of which the following is a specification.

The present invention relates to the manufacture of new silicate cements comprising essentially mixtures of suitable inorganic bases, such as magnesium oxid, beryllium oxid or mixtures thereof with solutions of silicic acid of high percentage. The solutions of silicic acid are obtained by hydrolysis of certain organic silicon compounds, such as the mono, di, tetra, hexa, and poly alkyl esters of orthosilicic acid or mixtures of such esters by means of water or dilute acids. In preparing the solutions of silicic acid an alcoholate of an alkaline earth metal or of magnesium or of aluminum or mixtures of such alcoholates may be added to the organic silicon compound advantageously prior to the hydrolysis.

The cements have proven to be valuable for filling teeth.

In order to illustrate this method of proceeding more fully the following examples are given, the parts being by weight:—

*Example A.*—7.2 parts of water or $\frac{n}{100}$ hydrochloric acid are gradually added to 15.3 parts of tetramethylic silicate $Si(OCH_3)_4$ whilst cooling. The hydrolysis proceeds with evolution of heat. The solution thus obtained is stable for a long time especially in a closed vessel. For the production of cement this liquid is stirred with 30 parts of a finely powdered mixture of molten feldspar and 0.5 per cent of magnesium oxid. When the cement is superficially solidified it is covered with water and is allowed to harden. The cement thus produced is insoluble in water and dilute acids and distinguished by its great hardness.

*Example B.*—15.3 parts of monomethylic-silicate

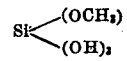

are split up with 4 parts of water as described in Example A. This solution is then stirred with a mixture of fluorid of calcium and 0.5 per cent of beryllium oxid. After some minutes the cement is solidified. It is suitably moistened with water.

*Example C.*—25.8 parts of hexamethylic-disilicate $Si_2O.(OCH_3)_6$ are mixed with 15.2 parts of tetramethylic silicate $Si(OCH_3)_4$. This mixture is split up with 15 parts of water and stirred with 81 parts of a mixture of molten and powdered feldspar and 0.5 part of magnesium oxid. The cement thus prepared has a greater hardness than that obtained from the simple orthoester.

*Example D.*—25.8 parts of hexamethylic silicate $Si_2O.(OCH_3)_6$ and 15.2 parts of tetramethylic silicate $Si(OCH_3)_4$ are mixed together and heated to boiling with 5 parts of aluminium methylate for one hour in a vessel provided with a reflux condenser. The methylate remains partly insoluble. The solution is decanted and decomposed with water (25 per cent of its weight). The reaction mass is then stirred for instance with such a quantity of glass powder containing an addition of 0.25 per cent of magnesium oxid that the mass receives a viscous property. After a short time it solidifies. Under water this hardening is accelerated.

Polyesters can also be used e. g.

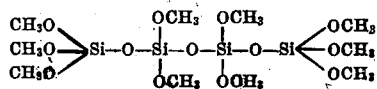

I claim:—

1. A cement comprising in admixture, an inorganic base, and a solution of a hydrolyzed organic silicon compound.

2. A cement comprising in admixture, an inorganic base, a solution of a hydrolyzed organic silicon compound, and feldspar, 3. A cement comprising in admixture, an inorganic base, and a solution obtainable by digesting an organic silicon compound with a metal alcoholate and hydrolyzing the resulting solution.

4. A cement comprising in admixture, an inorganic base, feldspar, and a solution obtainable by digesting an organic silicon compound with a metal alcoholate and hydrolyzing the resulting solution.

5. A cement comprising in admixture, an inorganic base, and a solution of a hydrolyzed alkyl ester of silicic acid.

6. A cement comprising in admixture, an inorganic base, and a solution of a hydrolyzed tetramethyl ester of silicic acid.

7. A cement comprising in admixture, magnesium oxid, and a solution of a hydrolyzed tetramethyl ester of silicic acid.

8. A cement comprising in admixture, magnesium oxid, feldspar, and a solution of a hydrolyzed tetramethyl ester of silicic acid.

9. A cement comprising in admixture, magnesium oxid, and a solution obtainable by digesting an alkyl ester of silicic acid with aluminum methylate and hydrolyzing the resulting solution.

10. A cement comprising in admixture, a plurality of inorganic bases, and a solution of a hydrolyzed alkyl ester of silicic acid.

11. A cement comprising in admixture, an inorganic base, and a solution of a hydrolyzed mixture of alkyl esters of silicic acid.

In testimony whereof I have hereunto set my hand in the presence of two subscribing witnesses.

HERMANN WEYLAND. [L. S.]

Witnesses:
HANS BRÜKNER, [L. S.]
EDUARD COMMBERG. [L. S.]

Certificate of Correction.

It is hereby certified that in Letters Patent No. 1,450,467, granted April 3, 1923, upon the application of Hermann Weyland, of Elberfeld, Germany, for an improvement in "Silicate Cements," an error appears in the printed specification requiring correction as follows: Page 2, line 19, claim 7, for the words "tetramethyl ester" read *alkyl ester;* and that the said Letters Patent should be read with this correction therein that the same may conform to the record of the case in the Patent Office.

Signed and sealed this 1st day of May, A. D., 1923.

[SEAL.]

KARL FENNING,
*Acting Commissioner of Patents.*